United States Patent
Roley

(10) Patent No.: US 6,536,419 B2
(45) Date of Patent: Mar. 25, 2003

(54) METHOD AND APPARATUS FOR PREHEATING OF COMBUSTION AIR FOR AN INTERNAL COMBUSTION ENGINE

(75) Inventor: Robert D. Roley, Windsor, IL (US)

(73) Assignee: Caterpillar Inc, Peoria, IL (US)

( * ) Notice: Subject to any disclaimer, the term of this patent is extended or adjusted under 35 U.S.C. 154(b) by 68 days.

(21) Appl. No.: 09/849,544

(22) Filed: May 4, 2001

(65) Prior Publication Data

US 2002/0162543 A1 Nov. 7, 2002

(51) Int. Cl.⁷ ............................................. F02M 21/04
(52) U.S. Cl. ...................................................... 123/556
(58) Field of Search ................................. 123/556, 542

(56) References Cited

U.S. PATENT DOCUMENTS

| | | | |
|---|---|---|---|
| 4,096,697 A | * | 6/1978 | Treuil .......................... 123/556 |
| 4,122,679 A | | 10/1978 | Charron |
| 4,426,972 A | | 1/1984 | Kimura et al. |
| 4,991,644 A | | 2/1991 | Misoulis et al. |
| 5,094,198 A | | 3/1992 | Trotts et al. |
| 5,138,987 A | | 8/1992 | Schmid et al. |
| 5,347,966 A | | 9/1994 | Mahon et al. |
| 5,482,013 A | | 1/1996 | Andrews at al. |
| 5,855,192 A | | 1/1999 | McCowan et al. |
| 6,293,262 B1 | * | 9/2001 | Craig et al. ................. 123/556 |
| 6,408,831 B1 | * | 6/2002 | Craig et al. ................. 123/556 |

* cited by examiner

*Primary Examiner*—Marguerite McMahon
(74) *Attorney, Agent, or Firm*—Tom L. Derry; Larry G Cain

(57) ABSTRACT

This invention provides a method and apparatus for preheating combustion (intake) air of an internal combustion engine during extreme cold ambient temperatures. A valve arrangement is provided to alter the flow of coolant through a radiator and aftercooler. During conditions where intake air temperature is below a predetermined temperature a fluid control valve causes coolant to first flow through a jacket water portion of the engine and next through the aftercooler where the intake air is preheated.

9 Claims, 2 Drawing Sheets

METHOD AND APPARATUS FOR PREHEATING OF COMBUSTION AIR FOR AN INTERNAL COMBUSTION ENGINE

TECHNICAL FIELD

This invention relates generally to an internal combustion engine, and more specifically to a method and apparatus for controlling the temperature of combustion (intake) air to the internal combustion engine.

BACKGROUND

Machines that are powered by internal combustion engines must be capable of operating in a variety of environmental conditions. One such example is operation in extreme temperatures. Additionally, customers and governmental regulations often require the engine to operate at maximum efficiency with minimum pollutant output. Research has shown that most diesel engines operate best when intake air temperature is between 42° C. and 48° C. (108° F. and 118° F.). Diesel engines often have turbochargers to increase performance and efficiency. The process of turbo-charging heats the intake air. The amount of heat produced is dependent upon how fast the engine is operating and the amount that the turbocharger is compressing the intake air. At low idle the temperature increase due to turbo-charging may only be 25° C. (77° F.), while at full load the temperature increase of the intake air may be 125° C. (257° F.) or more. Because of this temperature increase it is typical provide a method to cool the intake air.

Typical methods of cooling the intake air on a turbo-charged diesel engine are through the use of a separate circuit aftercooler (SCAC) or an air to air aftercooler (ATAC). A SCAC comprises a radiator having two portions (SCAC and jacket water), a SCAC pump, and an aftercooler (air to liquid heat exchanger) located down stream from the turbo-charger. Coolant flows from the SCAC portion of the radiator to the SCAC pump, after the SCAC pump the coolant then flows through the aftercooler to remove heat from the intake air. The heated coolant then flows back to the SCAC portion of the radiator.

During operation of diesel engines in extreme cold temperatures a different problem may occur. If the intake air temperature is below the 42° C.-48° C. (108° F.-118° F.) range, poor combustion may occur. When this condition occurs it desirable to pre-heat the intake air. It would additionally be beneficial to provide an automatic system for controlling the temperature of the intake air.

SUMMARY OF THE INVENTION

In a first aspect of the present invention a liquid cooled internal combustion engine having a radiator, a jacket water pump, an aftercooler and a fluid control valve. The fluid control valve is moveable between a first position and a second position. In the first position the control valve directs coolant from the jacket water pump to the aftercooler and a jacket water circuit of the engine simultaneously. In the second position the control valve directs coolant to the jacket water circuit first and to the aftercooler second.

In a second aspect of the present invention is a method for controlling the temperature of intake air in an internal combustion engine. The method for controlling the temperature includes providing intake air to an intake air circuit with an aftercooler. Next the temperature of the intake air is determined, if the temperature of the air is below a predetermined value, coolant is directed first through a jacket water circuit and next to the aftercooler. If the temperature is above the predetermined value, coolant is directed simultaneously through the jacket water circuit and the aftercooler.

DETAILED DESCRIPTION

The following description is of the best mode presently contemplated for carrying out the invention. This description is not intended to be taken in a limiting sense but is make merely for the purpose of describing the general principals of the invention.

Figure 1:
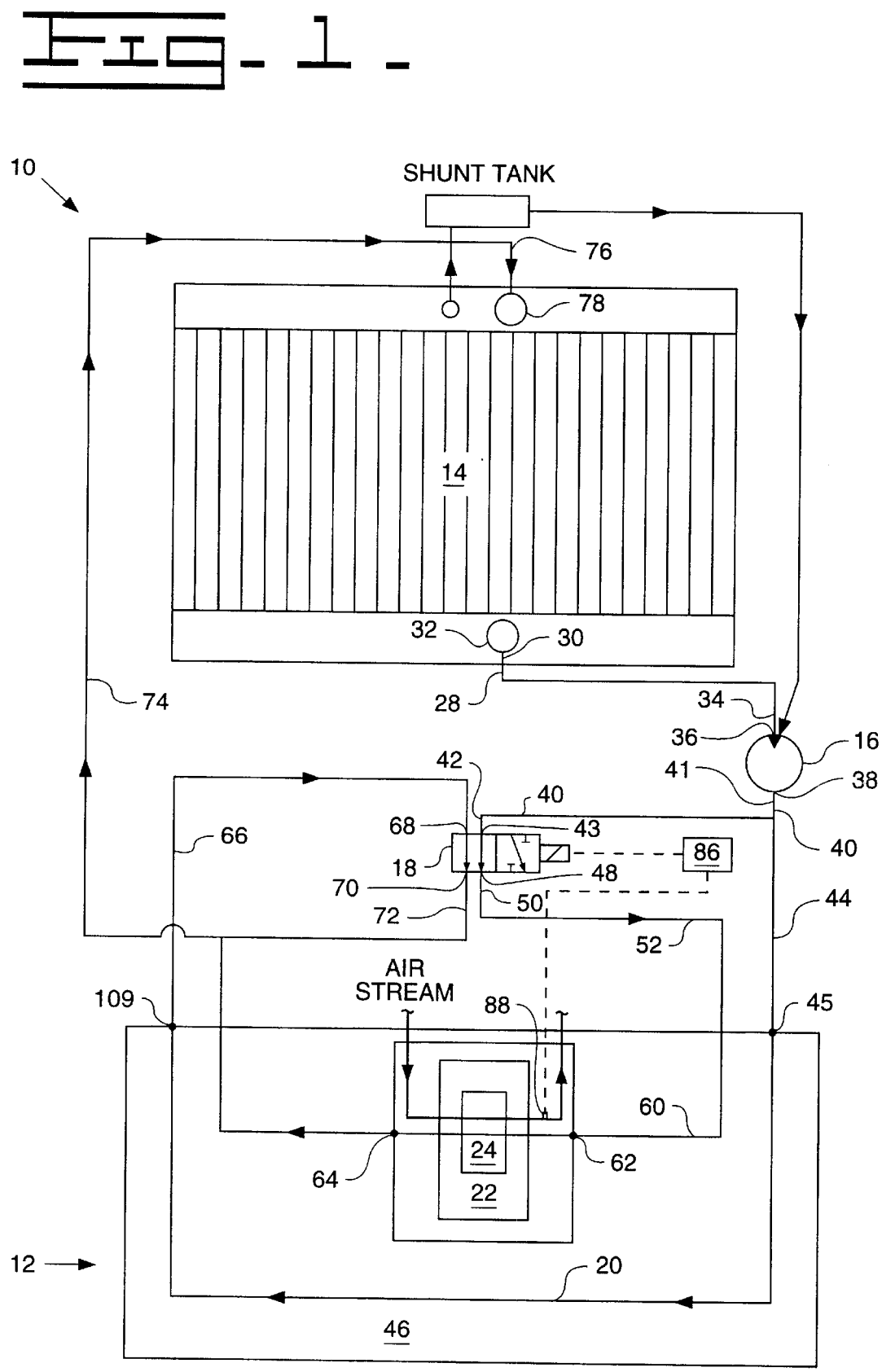
FIG. 1 is a schematic illustration of a cooling system having a jacket water pump and fluid control valve used to direct coolant flow.

Referring now to FIG. 1 is shown a schematic representation of a simplified cooling system 10 for an internal combustion engine 12. The cooling system 10 includes a radiator 14, a jacket water pump 16, a fluid control valve 18, a jacket water circuit 20 and an aftercooler 22. The aftercooler 22 provides an air-to-liquid heat exchanger 24 positioned within an intake air circuit 26. The intake air circuit 26 extends from an air filter (not shown) to a plurality of combustion chambers (not shown) of the engine 12.

The jacket water pump 16 has a supply line 28 having a first end 30 that connects to an outlet 32 near the bottom of the radiator 16 and a second end 34 that connects an inlet 36 on the jacket water pump 16. The jacket water pump 16 has an outlet 38 that connects to a first end 39 of a jacket water line 40. The jacket water line tee's to provide a second end 42 that connects to a first inlet port 43 on the fluid control valve 18, and a third end that 40 connects to an inlet 44 on a jacket water portion 46 of the engine 12. A first outlet port 48 of the fluid control valve 18 connects to a first end 50 of an aftercooler line 52. A second end 60 of the aftercooler line 52 connects to an aftercooler inlet 62. The jacket water portion 46 of the engine 12 includes an outlet 64 that is connected by an outlet line 66 to a second inlet port 68 of the fluid control valve 18. A second outlet port 70 of the fluid control valve 18 is connected to a first end 72 of a jacket water return line 74. A second end 76 of the jacket water return line 74 connects to a return port 78 on the radiator 14.

The fluid control valve 18 contains a spool 80 that is moveable between a first position 82 and a second position 84. In the first position 82 the spool 80 acts to connect the first inlet port 42 to the first outlet port 48 and connect the second inlet port 68 to the second outlet port 70. In the second position 82 the spool 80 closes the first inlet 42 and second outlet 70 ports while connecting the second inlet port 68 to the first outlet port 42. The fluid control valve 18 may be either manually or automatically actuated. An automatic fluid control valve 18 may be connected to an electronic controller 86. The electronic controller 18 may be connected to a temperature sensor 88 positioned in the intake air circuit 26 downstream of the aftercooler 22.

Figure 2:
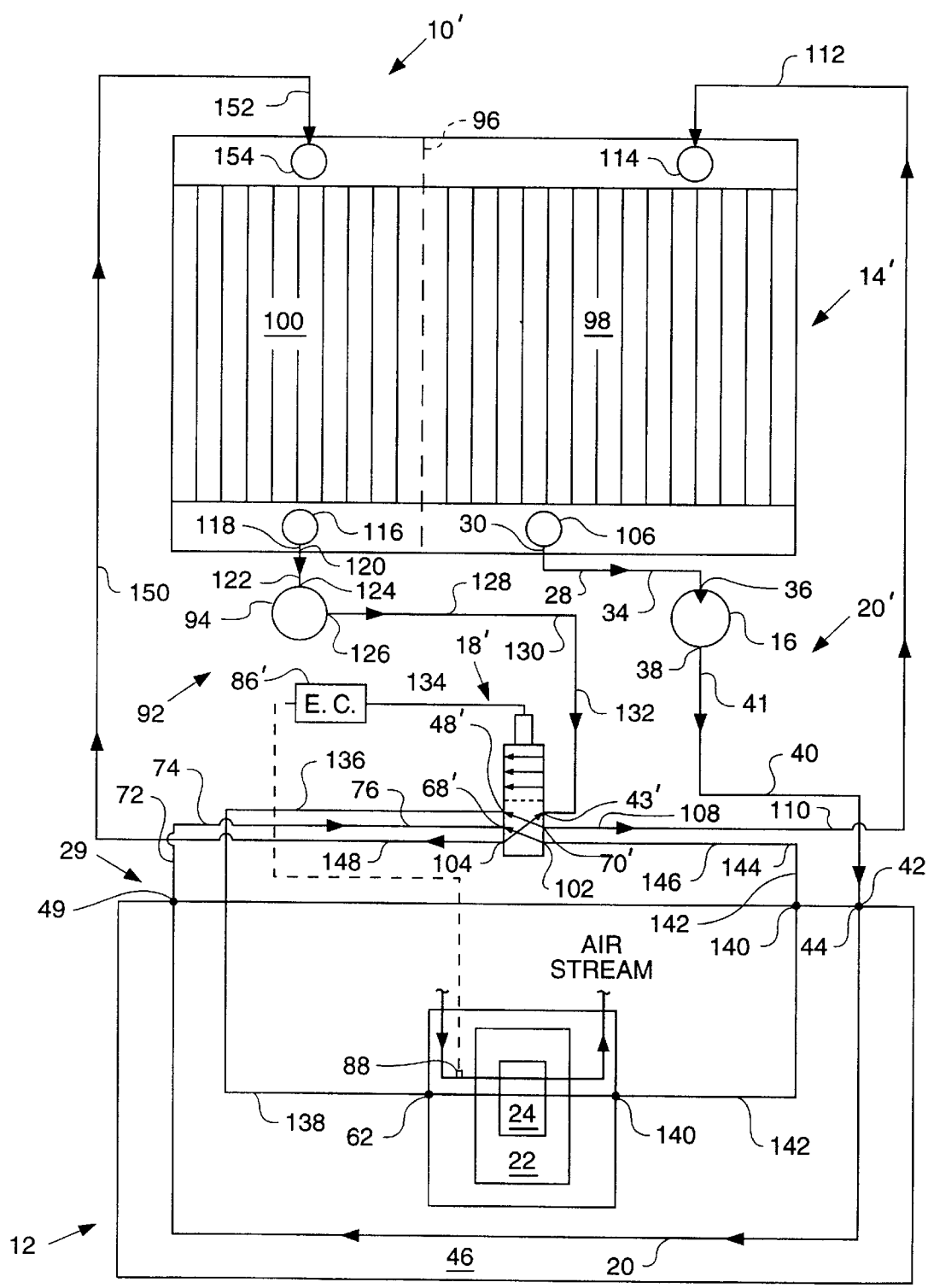
FIG. 2 is a schematic illustration of a cooling system having a jacket water pump, SCAC pump and a fluid control valve used to direct coolant flow.

Referring now to FIG. 2 is shown a schematic representation of a simplified cooling system 10' for an internal combustion engine 12 having a SCAC (separate circuit aftercooler) circuit 92. The cooling system 10' includes a radiator 14', a jacket water pump 16, a fluid control valve 18', a jacket water circuit 20, an aftercooler 22 and a SCAC pump 94. The radiator 14' is similar to that of FIG. 1 but additionally includes a vertical partition 96 to create a jacket water portion 98 and a SCAC portion 100 of the radiator. The partition 96 forms a partial barrier between the jacket water portion 98 and the SCAC portion 100.

The jacket water circuit 20' provides fluid communication from the jacket water portion 98 of the radiator to the jacket water pump 16 via a jacket water supply line 28. A first end 30 of the jacket water supply line 28 connects to the outlet 106 of the jacket water portion 98 of the radiator 14' and a second end 34 of the jacket water supply line 28 connects to the jacket water pump inlet 36. A first end 41 of a jacket water line 40 connects the outlet 38 of the jacket water pump 16 and a second end 42 attaches to an inlet 44 on the jacket water portion 46 of the engine 12. An outlet 106 on the jacket water portion 46 of the engine 12 connects to the first end 72 of a jacket water return line 74 and the second end 76 of the jacket water return line 74 connects to the second inlet port 68' of the fluid control valve 18'. A second outlet port 70' of the fluid control valve 18 connects to a first end 108 of a second jacket water return line 110, the second end 112 of the second jacket water return line 110 connects to an inlet 114 on the jacket water portion 98 of the radiator 14'.

The SCAC circuit 92 provides fluid communication from the SCAC portion 100 of the radiator 14' to the inlet 124 of the SCAC pump 94. An outlet 116 on the SCAC portion 100 of the radiator 14' is connected to a first end 118 of a SCAC supply line 120. A second end 122 of the SCAC supply line 120 connects to an inlet 124 on the SCAC pump 94. An outlet 126 on the SCAC pump 94 is connected to a first end 128 of a first SCAC line 130. A second end 132 of the first SCAC line 130 connects to the first inlet port 43' of the fluid control valve 18'. The first outlet port 48' of the fluid control valve 18' connects to a first end 132 of a second SCAC line 136. A second end 138 of the second SCAC line 136 connects to an inlet 62 on the aftercooler 22. An outlet 140 of the aftercooler 22 connects to a first end 142 of a first SCAC return line 144. A second end 146 of the first SCAC return line 144 connects to the third inlet port 102 of the control valve 18'. The third outlet port 104 of the fluid control valve 18' connects to a first end 148 of a second SCAC return line 150 and a second end 152 of the second SCAC line 148 connects to the return port 154 of the SCAC portion 100 of the radiator 114'.

The fluid control valve 18' also contains a spool (not shown) that is moveable between a first position 82' and a second position 84'. When the spool 80' of the fluid control valve 18' is the first position 82' the each of the first, second and third inlet ports (42',68',102) connect to the each of the respective outlet ports (44',70',104) of the fluid control valve 18'. When the spool 80' is in the second position 82' the first inlet port 42' connects to the third outlet port 104', the second inlet port 68' connects to the third inlet port 102', and the first outlet port 48' is connected to the second outlet port 70'.

The fluid control valve 18' may be either manually or automatically actuated. An automatic fluid control valve 18' may be connected to an electronic controller 86'. The electronic controller 86' may be connected to a temperature sensor 88' located intake air stream.

As an alternative to the above described cooling systems, a number of components such as oil coolers, turbocharger coolers, bypasses and expansion tanks may be included in the system. Such components have been removed from the description to focus on the invention.

INDUSTRIAL APPLICABILITY

The present invention is a system for controlling the temperature of intake (combustion) air of an internal combustion engine 12. Primarily the invention is intended to provide an apparatus for preheating the intake air during operation in extremely cold temperatures.

Referring now to FIG. 1 is illustrated a typical cooling system 10 having a single section radiator 14, a jacket water pump 16 and a fluid control valve 18. The cooling system 12 is coupled to an internal combustion engine 10 having a jacket water portion 46 for removing heat from the engine 12 and an aftercooler 22 for controlling the temperature of the intake air prior to combustion. Coolant in the radiator 14 is supplied to the jacket water pump 16 through a jacket water supply line 28 connected to the lower portion of the radiator 14. The jacket water pump 16 provides a flow of coolant to the jacket water circuit 20 and the first inlet port 43 of the fluid control valve 18. The first outlet port 48 of the fluid control valve 18 is connected to an aftercooler line 52 that provides flow to the inlet 62 of the aftercooler 22. The outlet 64 of the aftercooler 22 is connected to a jacket water return line 74 that provides flow back to the radiator 14. The outlet 64 of the aftercooler 22 is connected to the second inlet port 68 of the fluid control valve 18. The second outlet 70 of the fluid control valve 18 is connected to the jacket water return line 74. The jacket water return line 74 may be the same line that connects the outlet 64 of the aftercooler 22 to the radiator 14. In the first position 82, the spool of the fluid control valve 18 connects the first inlet port 43 to the first outlet port 48 and the second inlet port 68 to the second outlet port 70. In the second position 84, the fluid control valve 18 blocks the first inlet port 43 and the second outlet port 70 while connecting the second inlet port 68 to the first outlet port 48.

In operation, when the spool of the fluid control valve 18 is in the first position 82, flow from the jacket water pump 16 goes simultaneously to the aftercooler 22 and the jacket water circuit 20. When the spool is in the second position 84, flow from the jacket water pump 16 is first to the jacket water circuit 20 where heat is removed from the engine. Flow from the jacket water circuit 20 then is directed by the fluid control valve 18 to the inlet of the aftercooler 22. The coolant that was heated by the jacket water circuit 20 then heats the intake air going to the combustion chambers.

The fluid control valve 18 may be either manually actuated or an automatically actuated. For an automatically actuated system, a temperature sensor 88 to provides an input signal to an electronic controller 86. The input signal is dependent on the temperature of the intake air. The electronic controller 86 evaluates the signal to determine if the temperature of the intake air is below a predetermined temperature. If the temperature is above a predetermined temperature the spool in the fluid control valve 18 is moved to the first position 82, causing flow to go from the jacket water pump 16 through the jacket water circuit 20 and aftercooler 22 simultaneously. If the temperature is below a predetermined value coolant flows from the jacket water pump 16 to the jacket water circuit 20 of the engine 12 then to the aftercooler 22. Using an infinitely controllable valve 18 allows the system to moderate the intake air temperature more precisely.

Referring now to FIG. 2, a radiator 14' having a jacket water portion 98 and a SCAC portion 100 supplies coolant to a jacket water pump 16 and a SCAC pump 94. It should be noted the partition 96 between the jacket water portion 98 and the SCAC portion 100 does not totally isolate the portions 98–100, coolant is permitted to equalize and flow between the systems. Coolant flows from the jacket water pump 16 to the inlet 45 of the jacket water portion 46 of the engine 12 through the jacket water line 40. From the outlet 109 of the jacket water portion 46 the jacket water return line 74 carries coolant to the second inlet port 68' of the fluid control valve 18'. With the spool of the fluid control valve 18' in the first position 82 coolant continues through to the second outlet port 70' and returns to the jacket water portion 98 of the radiator 14'.

Coolant from the SCAC pump 94 flows to the first inlet port 43' of the fluid control valve 18'. When the spool of the fluid control valve 18' is in the first position 82 coolant flows from the first inlet port 43' to the first outlet port 48'. From the first outlet port 48' coolant flows through the aftercooler 22 removing excess heat from the intake air. From the aftercooler 22 outlet 64 the now heated coolant flows to the third inlet port 102 of the fluid control valve 18'. Still in the first position, the fluid control valve 18' causes coolant to return to the SCAC portion 100 of the radiator 14'.

Moving the spool of the fluid control valve 18' to the second position 82 causes flow from the SCAC pump 94 to bypass the aftercooler 22 and circulate directly back to the SCAC portion 100 of the radiator 14'. Coolant from the jacket water pump 16 flows through the jacket water portion 46 of the engine 12 to the first inlet port 43' of the fluid control valve 18'. The fluid control valve 18' now causes the heated coolant to flow out of the third inlet port 102 of the fluid control valve 18' and through the aftercooler 22, heating the intake air. After flowing through the aftercooler 22 the coolant enters the first outlet port 48' of the fluid control valve 18', on to the second outlet port 70', and back to the jacket water portion 98 of the radiator 14'.

Other aspects, objects and advantages of this invention can be obtained from a study of the drawings, the disclosure and the appended claims.

What is claimed is:

1. An internal combustion engine having an air intake circuit and a jacket water circuit comprising;
   a radiator,
   a coolant pump,
   an aftercooler, and
   a fluid control valve moveable between a first position and a second position, said control valve being in said first position directing coolant from said coolant pump, simultaneously, to each of said jacket water circuit and said aftercooler, and said control valve being in said second position directing coolant first to said jacket water circuit and second to said intake circuit.

2. The internal combustion engine of claim 1, said water jacket cooling system further having a separate circuit aftercooler system (SCAC) comprising;
   a SCAC pump,
   said fluid control valve being in said first position directs coolant from said SCAC pump to said aftercooler circuit, and said fluid control valve being in said second position directs coolant from said jacket water pump first to said jacket water circuit and second to said aftercooler circuit, and from said SCAC pump to a SCAC portion of said radiator.

3. The internal combustion engine of claim 1, said fluid control valve being infinitely variable between said first position and said second position.

4. The internal combustion engine of claim 3, said fluid control valve being controlled between said first position and said second position responsive to an input signal defined by an intake air temperature.

5. The internal combustion engine of claim 4, said fluid control valve being controlled responsive to an electronic control signal being supplied by an electronic controller.

6. The internal combustion engine of claim 5, said electronic controller supplying said control signal in response to an input signal supplied by a temperature sensor corresponding to the temperature of intake air to said internal combustion engine.

7. A method of controlling intake air temperature in an internal combustion engine comprising;
   providing intake air to an intake air circuit with an aftercooler;
   determining the temperature of said intake air;
   directing coolant from a jacket water pump, first through a jacket water circuit of said internal combustion engine and second though said aftercooler, if said intake air temperature is below said first predetermined value; and
   directing coolant from said jacket water pump, simultaneously, to said aftercooler and said jacket water circuit if said intake air temperature is above said first predetermined value.

8. The method of controlling the temperature of intake air in said internal combustion engine if claim 7, further comprising;
   said first predetermined temperature being between 42° C. and 48° C. (107.6° F. and 118.4° F.).

9. A method of controlling the temperature of intake air in an internal combustion engine comprising;
   providing intake air to an intake air circuit having an after cooler;
   determining the temperature of said intake air;
   directing a flow of coolant from a SCAC pump to an aftercooler and directing coolant from a jacket water pump to the jacket water circuit if said intake air temperature is above a first predetermined value;
   directing said flow of coolant from said SCAC pump to a SCAC portion of a radiator and directing said flow of jacket water coolant first to said jacket water circuit and second to said aftercooler, if said intake air temperature is below said predetermined temperature.

* * * * *